United States Patent [19]

Jacobsen

[11] 4,018,391
[45] Apr. 19, 1977

[54] CONTROLLED HAY BALE METERING AND FEEDING DEVICE

[76] Inventor: Ralph O. Jacobsen, Kyle, Saskatchewan, Canada, Solito

[22] Filed: May 12, 1975

[21] Appl. No.: 576,783

[30] Foreign Application Priority Data

May 24, 1974 Canada .................. 200739

[52] U.S. Cl. .................. 241/152 A; 241/186 R; 241/200
[51] Int. Cl.² .................. B02C 18/16
[58] Field of Search .......... 241/200, 152, 154, 101, 241/101.7, 186, 189, 277

[56] References Cited

UNITED STATES PATENTS

| 822,765 | 6/1906 | Perkins | 241/152 A |
|---|---|---|---|
| 887,693 | 5/1908 | Richmond | 241/101 A |
| 2,439,014 | 4/1948 | Luhrmann | 241/101 A |
| 2,681,090 | 6/1954 | Hicks et al. | 241/101 A |
| 2,685,900 | 8/1954 | Cross | 241/101.7 |
| 3,225,803 | 12/1965 | Hayot | 241/200 |
| 3,527,417 | 9/1970 | Tompsett | 241/101.7 |

Primary Examiner—Roy Lake
Assistant Examiner—Neil Abrams
Attorney, Agent, or Firm—Cushman, Darby & Cushman

[57] ABSTRACT

A controlled hay bale metering and feeding device consists of a primary conveying channel and a secondary conveying channel in alignment therewith. The primary channel has means adjacent one of its ends for receiving and metering a hay bale placed therein and conveying means in the primary channel carries the metered bale to its other, delivery end where means associated with the secondary channel positively convey it from the primary channel either to storage or to an attachment.

3 Claims, 5 Drawing Figures

CONTROLLED HAY BALE METERING AND FEEDING DEVICE

This invention relates to a device for metering hay bales and in particular the invention is directed to a device which can be used as a bale metering and feeding attachment for a grinder mixer to break up hay bales into a form that will subsequently be used as animal feed.

When using baled hay as feed for animals, it must be thoroughly shredded and in some instances it is fed into a hammer mill of a grinder mixer where it is mixed with other granular material before being stored in a silo or some other storage means. The preferred use, although not the only use, of the present invention is as an attachment for a grinder mixer and in this form, the device is adapted to receive baled hay, meter it and convey it to the grinder mixer. An operaor places a bale either manually in the receiving end of the conveyor channel or on a gravity feed table, cuts and removes the twine binding the bale together. The weight of the bale feeds itself into a metering wheel assembly which divides the bale off into slabs which are subsequently conveyed along the channel by conveying means in the bottom section thereof. When the partially shredded slabs reach the other end of the conveying channel, they are subjected to means on the top portion thereof which positively conveys the material into the hammer mill of the grinder mixer. The mechanism may be driven either by the hydraulic system of an associated tractor or other farm implement or by an independent motor means.

In accordance with the broad aspect of the present invention, the device for breaking down hay bales comprises a primary conveying channel having a receiving end and a delivery end; means adjacent the receiving end of the primary channel for receiving and metering a hay bale placed therein; a secondary conveying channel extending from the delivery end of the primary channel and being inverted with respect thereto; means in the primary channel for conveying a metered bale from the receiving end to the delivery end of the channel; means in the secondary channel for receiving, and positively conveying a broken down bale from the delivery end of the primary channel; and power means for operating the shredding and conveying means.

The invention is illustrated by way of example in the accompanying drawings in which FIG. 1 is a plan view of the shredding device in accordance with this invention;

Figure 1:
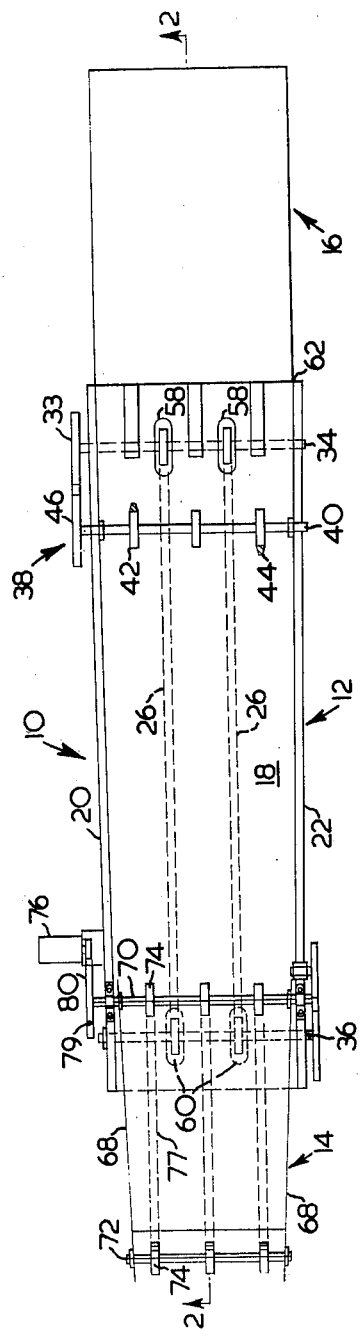
Figure 2:
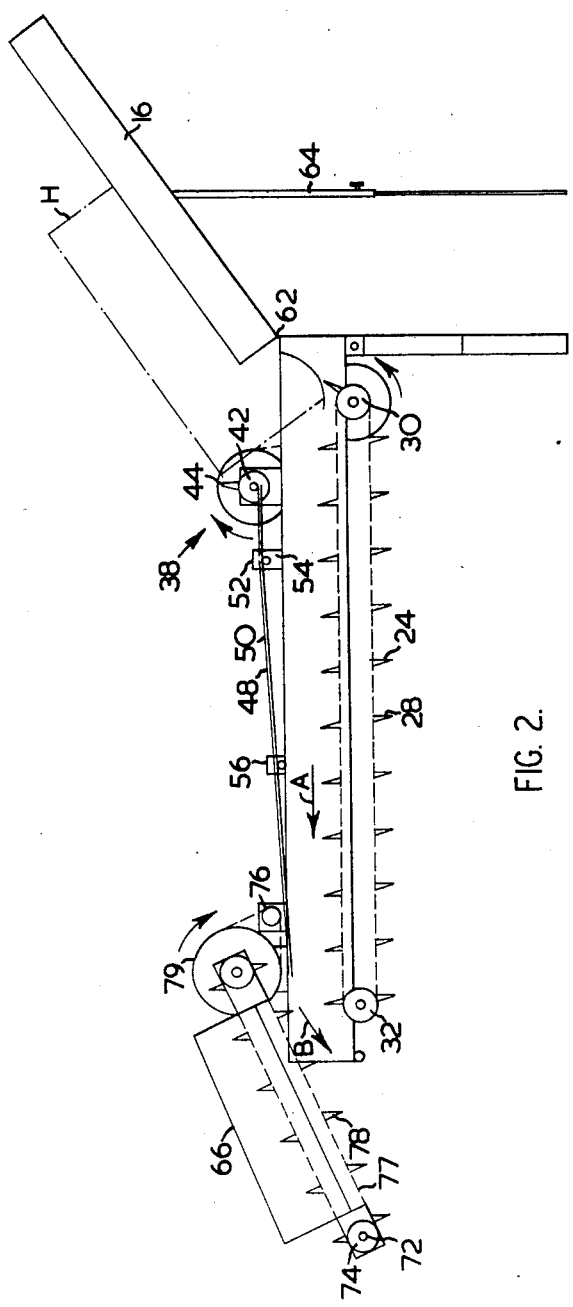
FIG. 2 is a sectional view taken along the lines 2—2 of FIG. 1.

Referring to the drawings and in particular FIG. 1, the device 10 for metering hay bales comprises a primary conveying channel 12, a secondary conveying channel 14 and a bale gravity feed table 16, the segments 12, 14 and 16 being hingably connected to one another. The primary conveying channel 12 is an elongated trough-like structure having a floor 18 and side walls 20 and 22. As shown in FIGS. 1 and 2, bottom wall 18 includes conveying means 24 in the form of a pair of roller chains 26 each having a plurality of conveying lugs 28 spaced therealong, each chain being trained around sprockets 30 at the receiving end of the primary channel 18 and sprockets 32 at the delivery end of primary channel 18. Sprockets 30 are mounted on an idler shaft 34 secured for rotation on the underside of bottom wall 18 and sprockets 32 are similarly mounted on an idler shaft 36 secured for rotation to the underside of bottom wall 18 adjacent the delivery end of channel 18.

Figure 3:
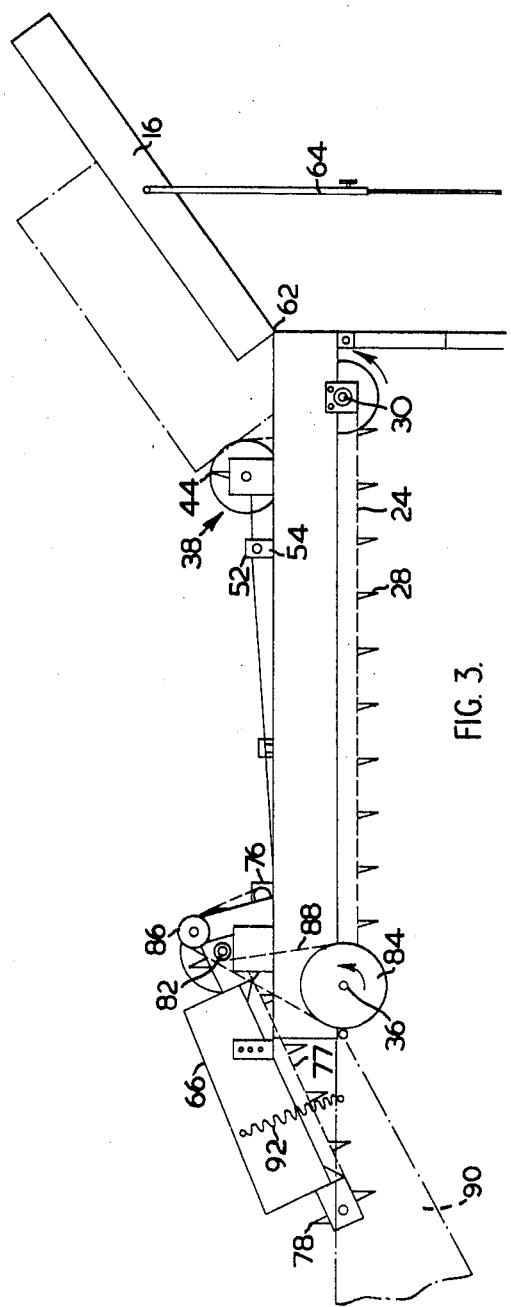
FIG. 3 is a side elevation view of the shredding device.
Figure 4:
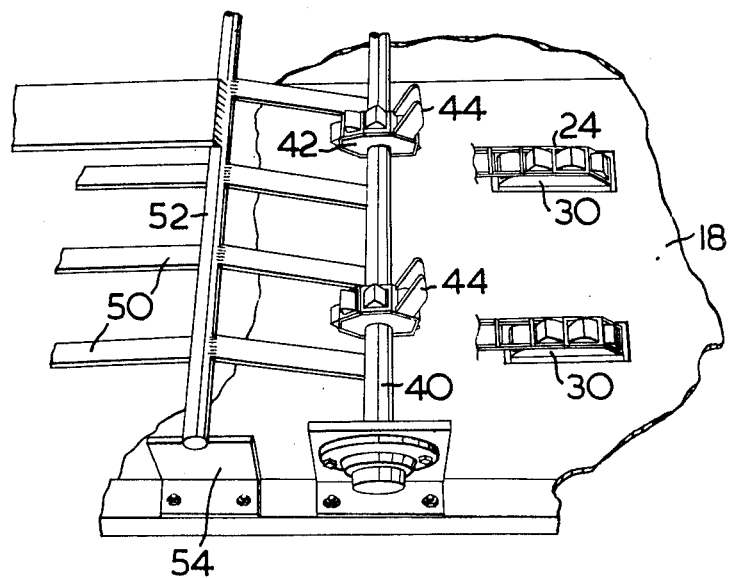
FIG. 4 is a partially section view of the metering sprocket assembly on the primary conveying channel.
Figure 5:
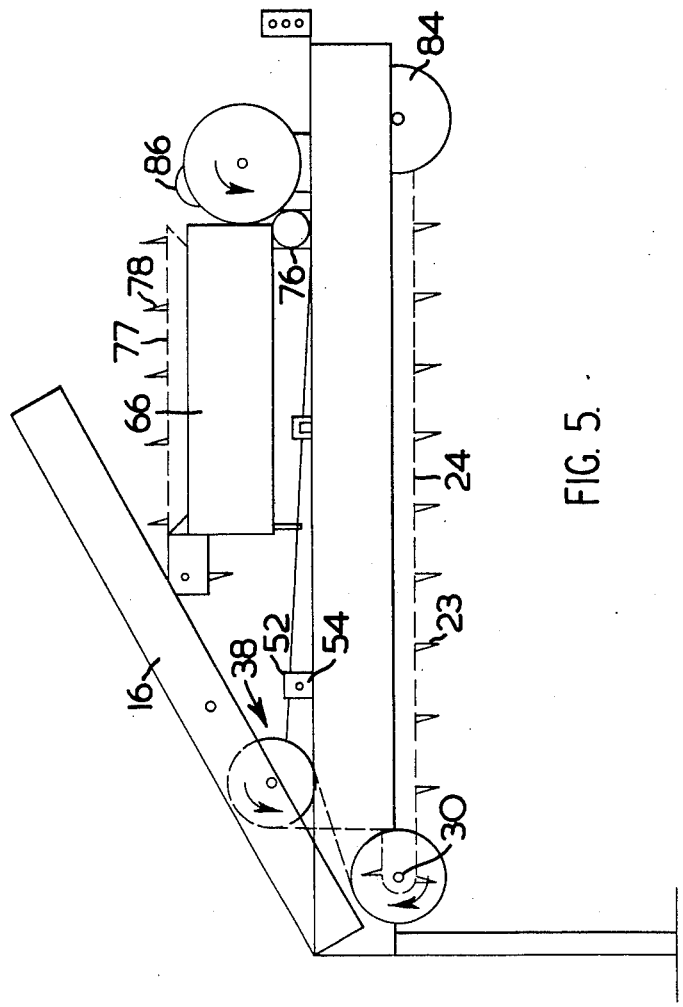
FIG. 5 is an elevation view of the shredding device in a folded, transportable position.

As shown in FIGS. 2 and 3, a metering sprocket assembly 38 consists of an idler shaft 40 mounted transversely of the longitudinal axis of channel 18 and adjacent to and parallel with the idler shaft 30. Shaft 40 is mounted for rotation across the top of the side walls 20 and 22 of channel 18 and as shown in FIG. 4, shaft 40 is provided with a plurality of gear like members 42 each having one or more lugs 44 thereon. While the idler shaft 34 is driven counterclockwise as seen in FIG. 2 so that the conveyor lugs carry material from the right to the left of FIG. 2, shaft 40 has its sprocket 46 engaged with sprocket 33 by a cross over belt arrangement so that the sprocket 46 and the lugs 44 rotate in a clockwise direction as seen in FIG. 2.

In view of the forgoing, it would be appreciated from FIGS. 2 and 3 that, when a hay bale H is dropped into the feed table 16, it will fall by its own weight downwardly where its lower end will engage the metering sprocket assembly 38 and in particular the lugs 44 on shaft 40 will tend to partially shred or peel off segments of the bale H and drive them downwardly onto the floor or bottom wall 18 of the primary channel 12 where the lugs 28 on the chains 24 will carry the bale segments towards the delivery end of the channel. As shown in FIGS. 2 and 4, a hold-down guard 48 is adapted to maintain the bale segments within the confines of the walls of the channel 12. This guard 48 may consist of a plurality of longitudinally extending slats or flat bars 50 which are secured adjacent one of their ends to cross bar 52 mounted by means of suitable lugs 54 to the side walls 20 and 22 of the channel 12 as shown in FIG. 2, the free terminal ends of the bars 50 engaging the underside of shaft 40 as shown. This prevents the bars 50 from dropping downwardly too far into the confines of the channel 12. The other, free ends of the slats 50 may be raised to the point where such elevationn is limited by means of a cross bar 56 shown in FIG. 2. It will be appreciated from FIGS. 1 and 2 that the bottom wall or floor 18 of the primary conveying channel has openings 58 and 60 therein adjacent its receiving and delivery ends respectively to allow the top run of the chain conveyor 24 with its lugs 28 to pass upwardly through the bottom wall 18 and be carried along the floor 18 and down through the other apertures 60 at the other end of the channel where the reverse run is started on the underside of the channel 12.

The gravity feed table 16 is hingedly connected at 62 to the receiving end of the channel 12 and table 16 is provided with at least one extendable and adjustable leg 64 as shown in FIG. 2.

Referring now to FIGS. 1 and 3, the secondary conveyor channel 14 is inverted with respect to channel 12 and includes a top wall 66 and side walls 68. Extensions of the side walls carry a pair of spaced sprocket shafts 70 and 72, shaft 70 constituting the pivotal mounting between channel 12 and 14 and shaft 72 being positioned at the remote end of channel 14 as shown in FIGS. 1 and 3. Each shaft carries a suitable number of sprockets and chains, in the illustrated case, each shaft 70 and 72 carries three sprockets 74, a chain 76 being trained between each pair of sprockets and each chain 76 carrying a plurality of lugs 78 of substantially the same configuration as lugs 28 on chain 24.

The method of driving the conveyors will be appreciated from FIGS. 1 and 3 and as mentioned earlier in this disclosure, various drive systems are applicable to this invention but in the illustrated embodiment, an hydraulic orbit motor 76 is actuated by means of hydraulic lines, not shown, from an associated tractor and this motor can be adjusted speedwise by means of suitable valving. As shown in FIG. 1, sprocket shaft 70 which carries the sprockets 74 has a main driveable sprocket 79 interconnected to the motor 76 by a belt or chain 80. At the other end of shaft 70, best shown in FIG. 3, there is provided a driving sprocket 82 which is interconnected with a driven sprocket 84 on shaft 36 through an idler sprocket 86 and suitable drive belts or chains 88. It will be appreciated from a review of FIG. 1 that rotation of motor 76 by virtue of the above described drive system, serves to rotate sprockets 74 and its associate chains 77 in the secondary conveying channel and also sprockets 32 and 33 and its associated chain in the primary conveyor channel. Additionally, by virtue of the interconnection between sprockets 33 and 46, motor 76 also serves to rotate the metering sprocket assembly 38.

As shown in FIG. 3, the outer terminal end of the secondary conveying channel may be placed adjacent to or in the hopper 90 of a grinder, mixer. It will further be appreciated that as segments of hay bales are taken off the bale by the metering assembly 38 and conveyed along the channel 12 by the chain 24 and its lugs 28, a substantial pressure will be applied to the material as it is driven in the direction of arrow A (FIG. 2) where the path of the chain 76 and its lugs 78 driving in the direction of arrow B will further shred the hay bale segments to deliver them into the hopper 90 as shown in FIG. 3. This pressure of delivery in the directions of arrow A and B will have a tendency to lift the terminal end of the secondary conveying channel and to restrict such movement within limits, a pair of springs 92 may be utilized to interconnect the side walls 66 of the channel with a portion of the hopper to keep the shredded material from pulling into the hammer mill at too great a rate.

In operation, an operator places a hay bale on the gravity feed table 16 and, subsequent to cutting and removing any binding twine, the operator lifts or tilts the table 16 so that the bale is dropped down by gravity into the metering wheel assembly 38 where the revolving lugs 44 meters the bale off into slabs and presses the slabs downwardly onto the lugs 28 of the chain 24 travelling lengthwise in the bottom of the primary conveying channel. The slabs are thus carried to the delivery end of the channel where they are encountered by the rotating lugs 78 on the chains 77 which positively convey the bale material into the hopper 90 of the grinding, mixing machine.

It will be appreciated that the present invention provides a bale metering device with low horse power requirements, simplicity in design, and with the absense of knives it is not dangerous to the operator.

I claim:

1. A device for the metering and positive feeding of hay bales comprising:
   a. a primary conveying channel having a receiving end and a delivery end;
   b. means adjacent the receiving end of the primary channel for receiving and metering a hay bale placed therein;
   c. a secondary conveying channel extending from the delivery end of the primary channel and being inverted with respect thereto, said secondary conveying channel including a top wall and side walls inverted with respect to the primary channel;
   d. means in the primary channel for conveying a metered bale from the receiving end to the delivery end of the channel;
   e. means in the secondary channel, operating in conjunction with the primary channel conveying means, for receiving the metered bale material and positively conveying the same from the delivery end of the primary channel, said means in the secondary channel including a pair of spaced shafts, one mounted adjacent each end of said secondary channel, drive means on said spaced shafts and chains extending between said drive means and carrying pushing means thereon adapted to positively convey sections of said bale carried thereto by the conveying means in the primary channels; and
   f. power means for operating the metering and conveying means.

2. A device according to claim 1 wherein the primary conveying channel comprises an elongated structure having bottom and side walls, the means for receiving and shredding a hay bale comprising a plurality of lugs positioned for rotation on an axis transverse to the longitudinal axis of said channel and mounted above the bottom wall thereof.

3. A device according to claim 1 wherein the conveying means of the primary channel comprises sprocket means adjacent each end of the primary channel, chain means trained between the spaced sprockets with the upper run of said chain being adapted to be drawn along the bottom wall of said primary channel, the lug means on said chains carrying the portions of the metered bale from the receiving and metering means towards the secondary channel.

* * * * *